(12) United States Patent
Teter et al.

(10) Patent No.: US 7,138,063 B1
(45) Date of Patent: Nov. 21, 2006

(54) METHOD OF REMOVING ARSENIC AND OTHER ANIONIC CONTAMINANTS FROM CONTAMINATED WATER USING ENHANCED COAGULATION

(75) Inventors: David M. Teter, Edgewood, NM (US); Patrick V. Brady, Albuquerque, NM (US); James L. Krumhansl, Albuquerque, NM (US); Nadim R. Khandaker, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/351,365

(22) Filed: Feb. 10, 2006

Related U.S. Application Data

(60) Division of application No. 10/127,887, filed on Apr. 23, 2002, now abandoned, which is a continuation-in-part of application No. 09/886,175, filed on Jun. 20, 2001, now Pat. No. 7,074,336.

(51) Int. Cl.
*C02F 1/58* (2006.01)
*C02F 101/14* (2006.01)
*C02F 101/22* (2006.01)

(52) U.S. Cl. .................. 210/717; 210/724; 210/726; 210/911; 210/913; 210/915

(58) Field of Classification Search ................ 210/716, 210/717
See application file for complete search history.

(56) References Cited

U.S. PATENT DOCUMENTS

| | | | | |
|---|---|---|---|---|
| 4,049,545 | A * | 9/1977 | Horvath | 210/665 |
| 4,566,986 | A * | 1/1986 | Waldmann | 252/175 |
| 4,622,149 | A * | 11/1986 | Devuyst et al. | 210/717 |
| 4,840,735 | A * | 6/1989 | Goodwin | 210/721 |
| 5,137,640 | A * | 8/1992 | Poncha | 210/724 |
| 5,252,003 | A * | 10/1993 | McGahan | 405/129.25 |
| 5,348,662 | A * | 9/1994 | Yen et al. | 210/717 |
| 6,248,369 | B1 * | 6/2001 | Nier et al. | 424/637 |
| 6,254,312 | B1 * | 7/2001 | Chowdhury et al. | 588/320 |
| 6,322,701 | B1 * | 11/2001 | Delighiannis | 210/620 |
| 6,802,980 | B1 * | 10/2004 | Khandaker et al. | 210/724 |
| 6,830,695 | B1 * | 12/2004 | Brady et al. | 210/679 |
| 7,074,336 | B1 * | 7/2006 | Teter et al. | 210/683 |

* cited by examiner

Primary Examiner—Peter A. Hruskoci
(74) Attorney, Agent, or Firm—Robert D. Watson

(57) ABSTRACT

An improved water decontamination process comprising contacting water containing anionic contaminants with an enhanced coagulant to form an enhanced floc, which more efficiently binds anionic species (e.g., arsenate, arsenite, chromate, fluoride, selenate, and borate, and combinations thereof) predominantly through the formation of surface complexes. The enhanced coagulant comprises a trivalent metal cation coagulant (e.g., ferric chloride or aluminum sulfate) mixed with a divalent metal cation modifier (e.g., copper sulfate or zinc sulfate).

11 Claims, 3 Drawing Sheets

METHOD OF REMOVING ARSENIC AND OTHER ANIONIC CONTAMINANTS FROM CONTAMINATED WATER USING ENHANCED COAGULATION

CROSS-REFERENCE TO RELATED APPLICATIONS

This application is a divisional application of Ser. No. 10/127,887 filed Apr. 23, 2002 now abandoned; which is a continuation-in-part application of Ser. No. 09/886,175 filed Jun. 20, 2001 now U.S. Pat. No. 7,074,336; and the specifications thereof are incorporated herein by reference.

GOVERNMENT RIGHTS

The Government has rights to this invention pursuant to Contract No. DE-AC04-94AL85000 awarded by the U.S. Department of Energy.

BACKGROUND OF THE INVENTION

The present invention relates to decontamination of fluids containing ionic contaminants, especially water containing anionic contaminants, such as arsenic and chromium in the form of arsenate, arsenite, and chromate. In particular, the present invention relates to an improved water decontamination process comprising contacting water containing anionic contaminants with an enhanced coagulant that binds anionic species predominantly through the formation of surface complexes, wherein the sorbent material comprises a trivalent metal cation-based coagulant mixed with a divalent metal cation modifier.

For purposes of this disclosure, unless otherwise specified, the term "metal oxides" is intended to include both metal oxides and metal hydroxides. Likewise, the term "metal sulfates" is intended to include both metal sulfates and hydrous metal sulfates. Similarly, for purposes of this disclosure, "arsenic contaminants" includes arsenates, $As^V$, and arsenites, $As^{III}$.

Arsenic contaminants are examples of anionic contaminants that may be present in water as a result of natural as well as human-mediated causes. The long-term availability of safe and affordable drinking water depends, in part, on availability of effective and economical treatment means for removing arsenic contaminants (as well as other anionic contaminants, including chromate) from water. Successful treatment strategies, in turn depend on not otherwise significantly altering the water characteristics (for example, its pH) in ways that would make it non-potable.

Arsenic and other anionic contaminants likewise pose risks when present in fluids other than drinking water sources. For example, wastewater streams often contain such contaminants and require remediation even where they are not considered to be directly associated with potable drinking water sources. Inorganic arsenic in groundwater usually exists as a combination of neutral $As^{III}$ (arsenite) and anionic $As^V$ (arsenate). Arsenite is believed to be more toxic than arsenate. Conventional treatment methods generally remove arsenate more efficiently than arsenite because of coulombic attraction. Fortunately, $As^{III}$ (arsenite) is easily oxidized to $As^V$ (arsenate) by chlorine, permanganate, ozone, chlorine bleach, and peroxides (some of which are used in conventional water treatment systems). However, $As^{III}$, (arsenite) is not easily oxidized by chlorine dioxide ($ClO_2$), preformed chloramines, oxygen, or UV light.

Various sorbent methods for removing arsenic contaminants and other anionic contaminants from water have been used and developed previously. For example, certain trivalent metal oxide compounds, such as $Al_2O_3$ and $Fe_2O_3$ have been demonstrated to sorb anionic contaminants, including arsenic contaminants, from water. A drawback associated with use of such trivalent compounds alone is that, because they typically exhibit a point of zero charge from pH 7 to 9, the water to be treated may need to be acidified in order for these compounds to sorb anions to a significant degree. Thus, after treatment, in order to restore the potability of the treated water, further amendments must be added to bring the pH back up to a safely drinkable range. Similarly, tetravalent metal oxides such as $SiO_2$ could be effective anion sorbents, however, their point of zero charge is typically around pH 2, so extremely acidic conditions would needed for tetravalent metal oxides to sorb anions. Additionally, these substances are considered likely to fall outside of the range of useful sorbents because of other chemical issues associated with operating at such low pH.

The divalent metal oxide MgO or hydroxide, $Mg(OH)_2$, likewise, has been shown chemically to sorb anions including arsenic in water. Although use of MgO does not necessitate driving the pH of water outside of the potable range (divalent metal oxides tend to exhibit a point of zero charge that is pH 10 or higher), the long-term effectiveness of MgO as a sorbent for water decontamination, however, can be limited. This is due to its tendency to form carbonates in the presence of carbon in the water from natural (e.g., biological and atmospheric) sources. When this occurs, the carbonate species formed at the surface lack any significant electrostatic attraction for negatively charged ions. Thus, the sorbency of the MgO can be short-lived, absent taking steps to reverse the carbonate reaction and restore the sorbent.

The sorbency methods just discussed rely on the electrostatic attraction between positively charged surface species and negatively charged (i.e., anionic) contaminants. An altogether different mechanism that has been exploited to decontaminate water containing ionic contaminant species is ion exchange. Examples of ion exchange materials suitable for water decontamination include hydrotalcites (which exchange anions) and zeolites (which exchange cations). Although ion exchange materials have been shown to be effective without causing the types of problems associated with $Fe_2O_3$ and $Al_2O_3$ (pH concerns) or MgO (carbonate issues), ion exchange materials can be very expensive. Zeolites that allow for separations based on size are also used in some decontamination applications, but they do not sorb anionic species such as chromate and arsenic contaminants in water.

Coagulation is a commonly used method for treating water. Existing coagulation approaches for treating drinking water, wastewater, and surface water rely traditionally on adding trivalent metal cation coagulants (e.g., based on Fe(III) or Al(III)) to the contaminated water. The principal use of coagulants is to destabilize particulate suspensions and to enhance the rate of floc formation. Examples of these trivalent cation metal coagulants include hydrolyzable metal salts (HMS), such as iron-based salts (e.g., ferric chloride, ferric sulfate, and ferrous sulfate) and aluminum-based salts (e.g., aluminum sulfate, alum, and sodium aluminate ($NaAlO_2$)). The hydrolyzable metal salt coagulant (e.g., ferric chloride or alum) is added to the water containing anionic contaminants (and sometimes containing organic matter). The pH is then adjusted to near the pH of minimum solubility of, respectively, ferric hydroxide $Fe(OH)_3$ or aluminum hydroxide $Al(OH)_3$ (pH~7–8), whereupon the salts hydrolyze to form a series of iron or aluminum hydroxide precipitates (i.e., hydrolysis products), generically called flocs. The most commonly used coagulants in industry are ferric chloride and alum. Typically, they are supplied from the manufacturer in a highly concentrated form, and are injected into the flowstream of a water treatment plant upstream of a mixing or flocculation chamber.

The flocs formed by HMS coagulants adsorb natural organic materials (NOMs), and certain inorganic materials, such as phosphates, arsenic compounds, fluoride, selenate, and borate. Negatively charged anions, including $As^V$, subsequently sorb from solution to bind with positively charged surface groups on the floc. The anion contaminant (e.g., arsenate) is sorbed as a tightly bound complex on the floc, which is removed from solution when the floc is separated from the water (typically in a clarifier or through filtration), leaving purified water. When an aluminum hydroxide floc is used, the sorbing process is most effective at a pH of 6.0–6.5. In general, iron-based flocs are significantly more effective at removing arsenic than aluminum-based flocs.

The phrases "hydrolyzable metal salts" and "metal salt coagulants" are defined herein to include prehydrolyzed metal salt solutions, such as polyaluminum chloride or polyaluminum hydroxychloride (PACl), and polyiron chloride (PlCl); as well as solutions that contain a strong acid, typically sulfuric acid (e.g., acidulated alum or acid alum).

Special additives (e.g., phosphoric acid, sodium silicate, and calcium salts) can be added to solutions of metal salt coagulants to improve performance or address specific problems. Metal salt solutions are also sold premixed with cationic polyelectrolyte coagulant compounds, such as epichlorohydrin dimethylamine (epiDMA) and polydiallyl dimethylammonium chloride (polyuDADMAC), which belong to a class called quaternary amines.

Polyelectrolytes can also be used to treat water. They are often categorized as either primary coagulant polymers or flocculent polymers (i.e., coagulation aid). The primary coagulant polymers can be used alone, or in combination with, metal salt coagulants, such as alum. Additionally, the flocculent polymer coagulant aids are often added after flocculation to increase the size and strength of particle aggregates (i.e., flocs). Activated silica ($SiO_2$) can also be used as a coagulation aid in combination with alum to improve the efficiency of flocculation and sedimentation, especially in cold winter months.

The costs of using a coagulation process for water treatment include the supply costs of the coagulant medium; downtime due to backwash and filter replacement; and the cost of replacing clogged filters. As the regulations for water quality become tighter, as has recently happened for arsenic levels in water (i.e., from 50 ppb to 10 ppb), the costs of treating water can greatly increase, and can become prohibitively high for small community water systems and individual wells.

The need remains, therefore, for an improved water decontamination process that is more effective and less expensive than existing coagulation methods for removing anionic contaminants, including chromate, arsenates and arsenites.

SUMMARY OF THE INVENTION

The present invention relates to an improved water decontamination process comprising contacting water containing anionic contaminants with an enhanced coagulant to form an enhanced floc, which more efficiently binds anionic species (e.g., arsenate, arsenite, or chromate) predominantly through the formation of surface complexes. The enhanced coagulant comprises a trivalent metal cation coagulant (e.g., ferric chloride or aluminum sulfate) combined with a divalent metal cation modifier (e.g., copper sulfate or zinc sulfate).

BRIEF DESCRIPTION OF THE DRAWINGS

The accompanying drawings, which are incorporated into and form a part of the specification, illustrate one or more embodiments of the present invention and, together with the description, serve to explain the principles of the invention.

DETAILED DESCRIPTION OF THE INVENTION

Figure 1:
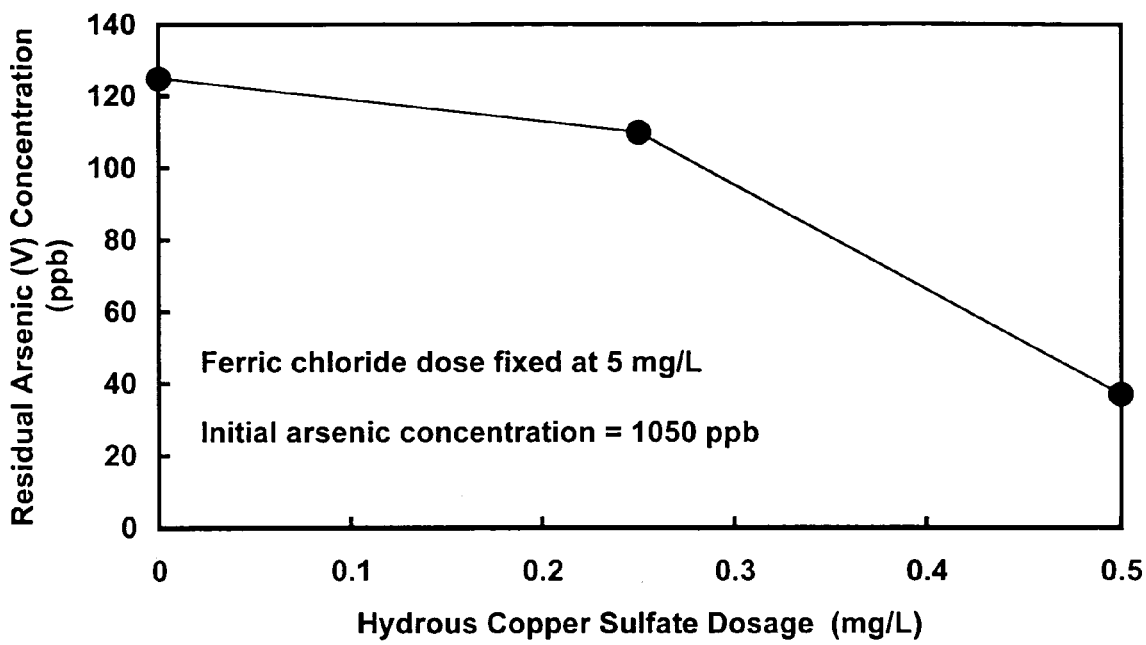
FIG. 1 shows the reduction in residual As(V) concentration with increasing concentration of divalent metal cation modifier ($CuSO_4.5H_2O$), using a fixed concentration of trivalent metal cation coagulant ferric chloride ($FeCl_3$), according to the present invention.

The present invention relates to an improved water decontamination process comprising contacting water containing anionic contaminants with an enhanced coagulant to form an enhanced floc, which more efficiently binds anionic species (e.g., arsenate, arsenite, chromate, fluoride, selenate, and borate, and combinations thereof) predominantly through the formation of surface complexes. The enhanced coagulant comprises a trivalent metal cation coagulant (e.g., ferric chloride or aluminum sulfate) combined with a divalent metal cation modifier (e.g., copper sulfate or zinc sulfate).

This invention utilizes the principle disclosed in the co-pending application Ser. No. 09/886,175 to Teter et al. that metal (hydr)oxides, at pH below their point of zero charge, attract negatively charged species. This is due to a phenomenon wherein, at pH below the point of zero charge for a given metal (hydr)oxide, surface metal groups tend to be more fully protonated (and thus more likely to exhibit a positive charge) than at pH at or above the point of zero charge. As a result, at pH below the point of zero charge, negatively-charged species (anions) can be removed from solution through the formation of anion-bearing surface complexes with the metal (hydr)oxide surface groups.

The materials employed in the present invention to adsorb negatively charged contaminant species in water do so at pH within the drinkable range for water. Moreover, the materials tested do not exhibit the tendency to form carbonates to a degree sufficient to render them inactive for purposes of anion sorption. According to the invention, sorbent materials effective for sequestering arsenic-containing contaminants from water are selected, or can be engineered, to exhibit a point of zero charge that permits anion sorption in the pH range of potable water.

According to the present invention, the effectiveness and efficiency of the commonly used trivalent metal cation coagulants (e.g., ferric chloride and alum) can be significantly enhanced by incorporating a divalent metal cation (e.g., $Zn^{2+}$, $Cu^{2+}$, or combinations thereof) on to the surface of the coagulant or floc. The incorporation of divalent metal cation modifies the surface chemistry of the coagulant, resulting in a modified material having enhanced coagulation properties. The addition of divalent metal cations increases the capability and capacity of the coagulated flocs to sorb anions by an amount above and beyond that predicted from simply considering the increased mass of floc. This unexpected increase is believed to occur because combination of divalent metal cations with the trivalent metal cation coagulant causes a significant increase in the surface area-normalized number of anion-sorbing positively-charged surface groups. In other words, the effective zero point of charge ($pH_{zpc}$) of the floc is increased by divalent metal cation addition. This is consistent with the general observation of increasing $pH_{zpc}$ with decreasing cation charge of metal (hydr)oxides.

The enhanced coagulant can be produced by modifying a trivalent metal cation coagulant with divalent metal cations, for example, by combining the coagulant with a divalent metal cation modifier. This modification changes the chemistry of the coagulant to enhance arsenic sorption. The trivalent metal cation coagulant can comprise any hydrolyzable metal salt (HMS), such as an iron-based salt (e.g., ferric chloride, ferric sulfate, and ferrous sulfate); an aluminum-based salt (e.g., aluminum sulfate $Al_3(SO_4)_2$, alum ($Al_2(SO_4)_3.14H_2O$), and sodium aluminate ($NaAlO_2$); or combinations thereof.

The divalent metal cation modifier can comprise any water-soluble compound that releases free divalent cations when dissolved in water. The divalent metal cation modifier can comprise, for example, any water-soluble copper compound that releases free $Cu^{2+}$ cations when dissolved in water (e.g., copper sulfate ($CuSO_4$, $CuSO_4.5H_2O$); copper chloride ($CuCl_2$, $CuCl_2.H_2O$); copper nitrate ($Cu(NO_3)_2.6H_2O$); and copper acetate, or combinations thereof). Alternatively, the divalent metal cation modifier can comprise any water-soluble zinc compound that releases free $Zn^{2+}$ cations when dissolved in water (e.g., hydrous zinc sulfate ($ZnSO_4$, $ZnSO_4.7H_2O$); zinc chloride ($ZnCl_2$); hydrous zinc nitrate ($Zn(NO_3)_2.6H_2O$); and anhydrous zinc nitrate ($Zn(NO_3)_2$), or combinations thereof).

Experiments were performed where the concentration of added divalent metal cation modifier ranged from 0 to 5 mg/L.

Experimental Results

Three sets of experiments were performed to investigate the performance of the coagulants with and without added divalent metal cation modifiers.

First Set of Experiments

FIG. 1 shows the reduction in residual As(V) concentration with increasing concentration of divalent metal cation modifier ($CuSO_4.5H_2O$), using a fixed concentration of trivalent metal cation coagulant ferric chloride ($FeCl_3$), according to the present invention. Table 1 summarizes the results shown in FIG. 1.

TABLE 1

Enhanced Coagulation Results Using Fe—Cu System
Initial Arsenic (V) Concentration = 1050 ppb, Initial pH = 8.0

| Coagulant Dose (mg/L) ($FeCl_3$) | Modifier Dose (mg/L) (Hydrous Copper Sulfate) | Residual Concentration of Arsenic (V) (ppb) |
|---|---|---|
| 5.0 | 0 | 125 |
| 5.0 | 0.25 | 110 |
| 5.0 | 0.5 | 37 |

Albuquerque tap water was spiked with arsenic to create an initial concentration of As(V) of 1050 ppb, with an initial pH=8.0. FIG. 1 shows that adding 5 mg/L of ferric chloride coagulant (without any modifier) to the contaminated water caused a reduction in the As(V) concentration from 1050 ppb to 125 ppb. Then, increasing amounts of the divalent cation modifier hydrous copper sulfate were added to the contaminated water having a fixed concentration (5 mg/L) of ferric chloride coagulant, and the residual As(V) concentration was measured again. FIG. 1 shows that increasing the concentration of hydrous copper sulfate further reduced the residual As(V) concentration. At the maximum dosage (0.5 mg/L) of hydrous copper sulfate used in this first series of experiments, the residual As(V) concentration was reduced from 125 ppb (coagulant without modifier) to 37 ppb (coagulant plus modifier). At this dosage of modifier (0.5 mg/L), this modification caused an enhancement of the sorption (i.e., removal) efficiency from 88% (coagulant without modifier) to 96% (coagulant plus modifier).

Figure 2:
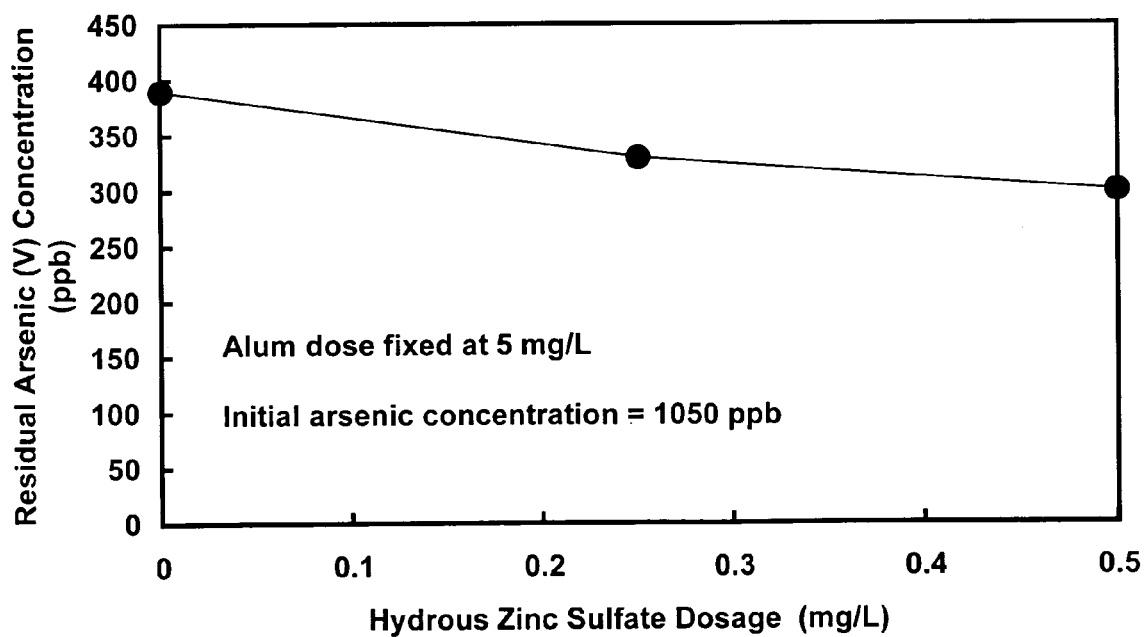
FIG. 2 shows the reduction in residual As(V) concentration with increasing concentration of divalent metal cation modifier ($ZnSO_4.7H_2O$), using a fixed concentration of trivalent metal cation coagulant alum ($Al_2(SO_4)_3.14H_2O$), according to the present invention.

FIG. 2 shows the reduction in residual As(V) concentration with increasing concentration of divalent metal cation modifier ($ZnSO_4.7H_2O$), using a fixed concentration of trivalent metal cation coagulant alum ($Al_2(SO_4)_3.14H_2O$), according to the present invention. Table 2 summarizes the results shown in FIG. 2.

TABLE 2

Enhanced Coagulation Results Using Al—Zn System
Initial Arsenic (V) Concentration = 1050 ppb, pH = 8.0

| Coagulant Dose (mg/L) (Alum) | Modifier Dose (mg/L) (Hydrous Zinc Sulfate) | Residual Concentration of Arsenic (V) (ppb) |
|---|---|---|
| 5.0 | 0 | 390 |
| 5.0 | 0.25 | 330 |
| 5.0 | 0.5 | 300 |

Albuquerque tap water was spiked with arsenic to create an initial concentration of As(V) of 1050 ppb, with an initial pH=8.0. FIG. 2 shows that adding 5 mg/L of alum coagulant (without any modifier) to the contaminated water caused a reduction in the As(V) concentration from 1050 ppb to 390 ppb. Then, increasing amounts of the divalent cation modifier hydrous zinc sulfate were added to the contaminated water having a fixed concentration (5 mg/L) of alum coagulant, and the residual As(V) concentration was measured again. FIG. 2 shows that increasing the concentration of hydrous zinc sulfate further reduced the residual As(V) concentration. At the maximum dosage (0.5 mg/L) of hydrous zinc sulfate used in this first series of experiments, the residual As(V) concentration was reduced from 390 ppb (coagulant without modifier) to 300 ppb (coagulant plus modifier). At this dosage of modifier (0.5 mg/L), this modification caused an enhancement of the sorption (i.e., removal) efficiency from 63% (coagulant without modifier) to 71% (coagulant plus modifier).

Comparing the results shown in FIGS. 1 and 2, it can be seen that doping ferric chloride coagulant with $Cu^{2+}$ cations is more effective at removing As(V) than doping alum coagulant with $Zn^{2+}$ cations. However, $Cu^{2+}$ soluble salts are more expensive than $Zn^{2+}$ soluble salts. Therefore, selection between copper or zinc salts requires a comparison of costs versus removal efficiency.

Second Set of Experiments

A second set of experiments were performed that investigated the effect of increasing concentrations (up to 10 mg/L) of the trivalent metal cation coagulants (ferric chloride or alum) without using any added divalent metal cation modifiers.

Figure 3:
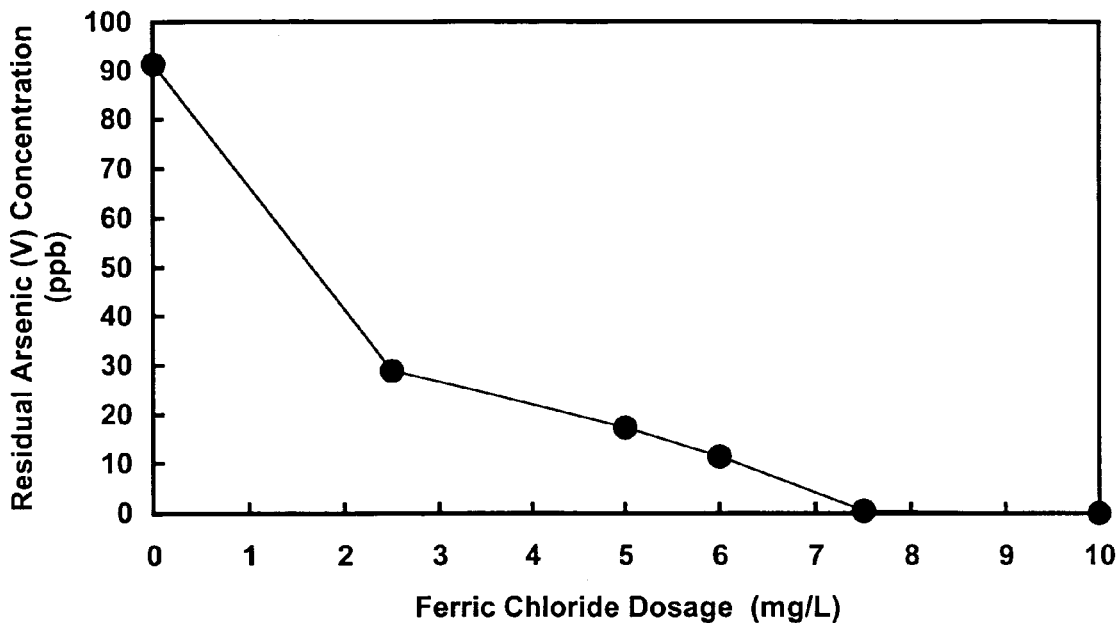
FIG. 3 shows the reduction in residual As(V) concentration with increasing concentration of the trivalent metal cation coagulant ferric chloride, $FeCl_3$, without any added modifiers.

FIG. 3 shows the reduction in residual As(V) concentration with increasing concentration of the trivalent metal cation coagulant ferric chloride, $FeCl_3$, without any added modifiers. Table 3 summarizes the results shown in FIG. 3.

TABLE 3

Baseline Coagulation Results Using $FeCl_3$
Initial Arsenic (V) Concentration = 91 ppb, Initial pH = 8.2

| Coagulant Dose (mg/L) ($FeCl_3$) | Modifier Dose (mg/L) (Hydrous Copper Sulfate) | Residual Concentration of Arsenic (V) (ppb) |
|---|---|---|
| 0 | 0 | 91 |
| 2.5 | 0 | 29 |
| 5 | 0 | 17 |
| 6 | 0 | 11 |
| 7.5 | 0 | 0 |
| 10 | 0 | 0 |

Albuquerque tap water was spiked with arsenic to create an initial concentration of As(V) of 91 ppb, with an initial pH=8.2. FIG. 3 shows that adding 5 mg/L of $FeCl_3$ coagulant (without any modifier) to the contaminated water caused a reduction in the As(V) concentration from 91 ppb to 17 ppb (a removal efficiency of 81%). Increasing additions of $FeCl_3$ at concentrations greater than 7.5 mg/L reduced the residual As(V) concentration to zero (a removal efficiency of 100%).

Figure 4:
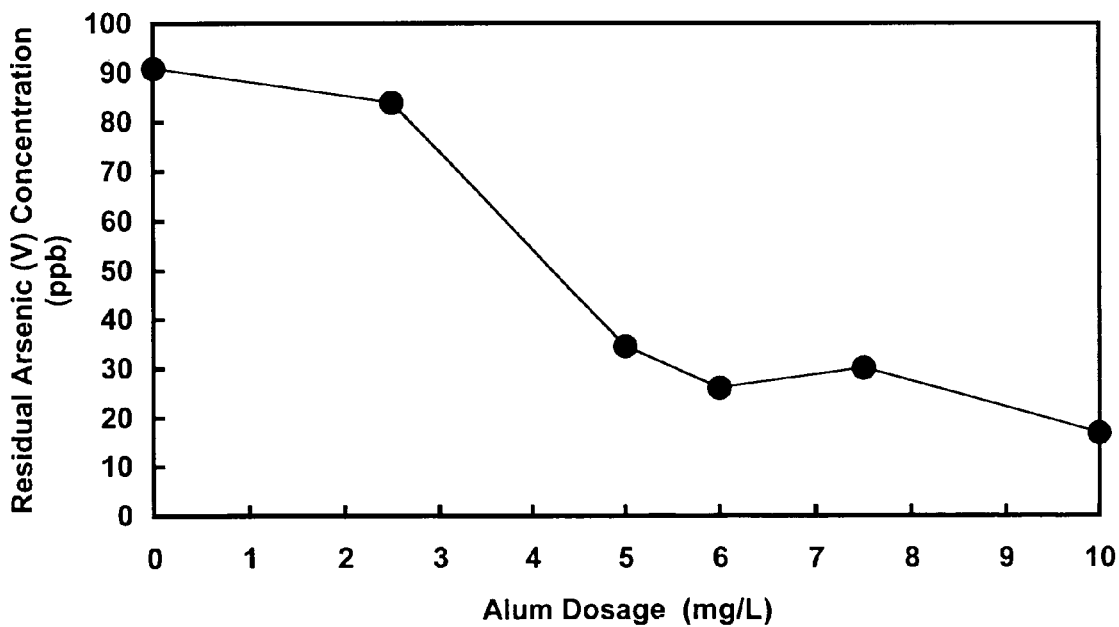
FIG. 4 shows the reduction in residual As(V) concentration with increasing concentration of the trivalent metal cation coagulant alum, without any added modifiers.

FIG. 4 shows the reduction in residual As(V) concentration with increasing concentration of the trivalent metal cation coagulant alum, without any added modifiers. Table 4 summarizes the results shown in FIG. 4.

TABLE 4

Baseline Coagulation Results Using Alum
Initial Arsenic (V) Concentration = 91 ppb, Initial pH = 8.2

| Coagulant Dose (mg/L) (Alum) | Modifier Dose (mg/L) (Hydrous Zinc Sulfate) | Residual Concentration of Arsenic (V) (ppb) |
|---|---|---|
| 0 | 0 | 91 |
| 2.5 | 0 | 84 |
| 5 | 0 | 34 |
| 6 | 0 | 26 |
| 7.5 | 0 | 30 |
| 10 | 0 | 17 |

Albuquerque tap water was spiked with arsenic to create an initial concentration of As(V) of 91 ppb, with an initial pH=8.2. FIG. 4 shows that adding 5 mg/L of alum coagulant (without any modifier) to the contaminated water caused a reduction in the As(V) concentration from 91 ppb to 34 ppb (a removal efficiency of 63%). Further addition of alum at concentrations up to 10 mg/L reduced the residual As(V) concentration to 17 ppb (a removal efficiency of 81%).

A comparison of the results shown in FIGS. 3 and 4 indicates that it takes roughly twice as much alum coagulant (without modifier) to have the same reduction in arsenic (V) concentration as using ferric chloride coagulant (without modifier).

Third Set of Experiments

A third set of experiments were performed to study the effect of adding divalent metal cation modifiers to arsenic contaminated water having a fixed concentration (5 mg/L) of trivalent metal cation coagulant. The maximum concentration of the divalent metal cation modifiers selected to be studied in this third set of experiments was increased over the previous value of 0.5 mg/L (see FIGS. 1 and 2) to 5 mg/L in the present experiments.

Figure 5:
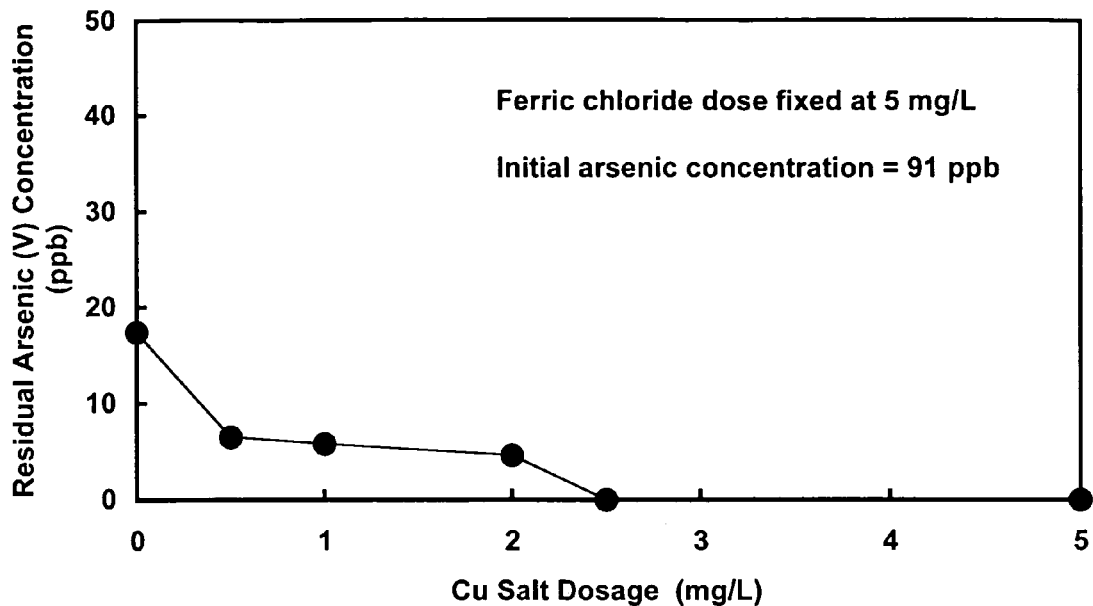
FIG. 5 shows the reduction in residual As(V) concentration with increasing concentration of divalent metal cation modifier "Cu Salt" ($CuSO_4.5H_2O$), using a fixed concentration (5 mg/L) of trivalent metal cation coagulant ferric chloride ($FeCl_3$), according to the present invention.

FIG. 5 shows the reduction in residual As(V) concentration with increasing concentration of divalent metal cation modifier "Cu Salt" ($CuSO_4 \cdot 5H_2O$), using a fixed concentration (5 mg/L) of trivalent metal cation coagulant ferric chloride ($FeCl_3$), according to the present invention. Table 5 summarizes the results shown in FIG. 5.

TABLE 5

Enhanced Coagulation Results Using Fe—Cu System
Initial Arsenic (V) Concentration = 91 ppb, Initial pH = 8.2

| Coagulant Dose (mg/L) (Alum) | Modifier Dose (mg/L) (Hydrous Copper Sulfate) | Residual Concentration of Arsenic (V) (ppb) |
|---|---|---|
| 5 | 0 | 17 |
| 5 | 0.5 | 7 |
| 5 | 1 | 6 |
| 5 | 2 | 5 |
| 5 | 2.5 | 0 |
| 5 | 5 | 0 |

Albuquerque tap water was spiked with arsenic to create an initial concentration of As(V) of 91 ppb, with an initial pH=8.2. FIG. 5 shows that adding 5 mg/L of ferric chloride coagulant (without any modifier) to the contaminated water caused a reduction in the As(V) concentration from 91 ppb to 17 ppb (removal efficiency=81%). Then, increasing amounts of the divalent cation modifier hydrous copper sulfate were added to the contaminated water having a fixed concentration (5 mg/L) of ferric chloride coagulant, and the residual As(V) concentration was measured again. FIG. 5 shows that increasing the concentration of hydrous copper sulfate significantly reduced the residual As(V) concentration. At the minimum dosage of 0.5 mg/L of hydrous copper sulfate the residual As(V) concentration was reduced from 17 ppb (coagulant without modifier) to 7 ppb (coagulant plus modifier), which cuts the arsenic (V) concentration more than ½ from the case of using no modifier. Increasing the dosage of modifier to 2.5 mg/L (or more) caused essential all of the arsenic(V) to be removed.

Figure 6:
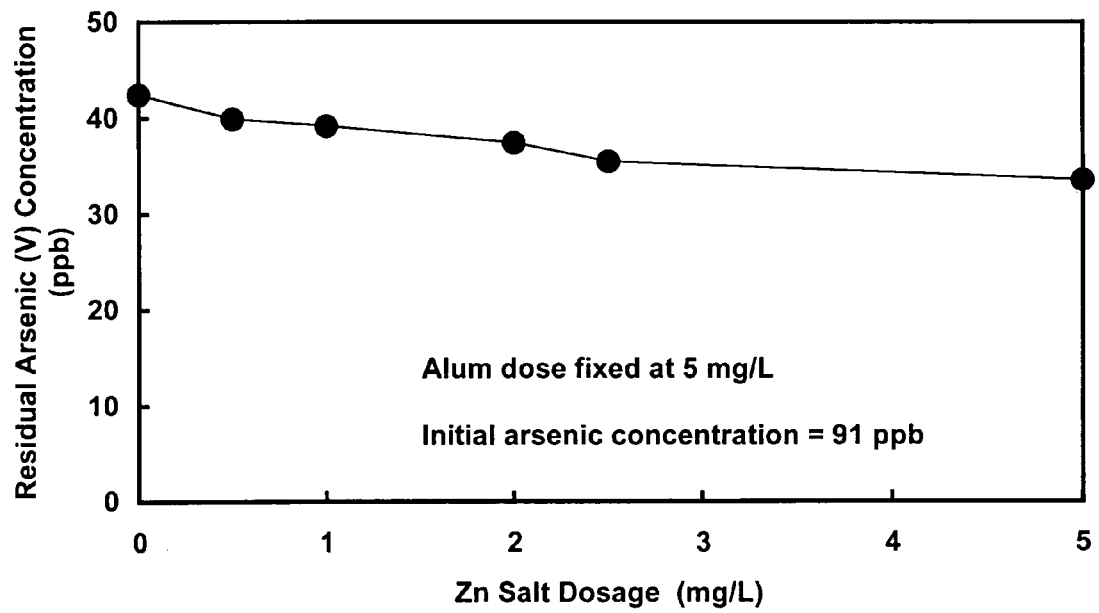
FIG. 6 shows the reduction in residual As(V) concentration with increasing concentration of divalent metal cation modifier "Zn Salt" ($ZnSO_4.7H_2O$), using a fixed concentration (5 mg/L) of trivalent metal cation coagulant alum ($Al_2(SO_4)_3.14H_2O$), according to the present invention.

FIG. 6 shows the reduction in residual As(V) concentration with increasing concentration of divalent metal cation modifier "Zn Salt" ($ZnSO_4 \cdot 7H_2O$), using a fixed concentration (5 mg/L) of trivalent metal cation coagulant alum ($Al_2(SO_4)_3 \cdot 14H_2O$), according to the present invention. Table 6 summarizes the results shown in FIG. 6.

TABLE 6

Enhanced Coagulation Results Using Al—Zn System
Initial Arsenic (V) Concentration = 91 ppb, Initial pH = 8.4

| Coagulant Dose (mg/L) (Alum) | Modifier Dose (mg/L) (Hydrous Zinc Sulfate) | Residual Concentration of Arsenic (V) (ppb) |
|---|---|---|
| 5 | 0 | 42 |
| 5 | 0.5 | 40 |
| 5 | 1 | 39 |
| 5 | 2 | 38 |
| 5 | 2.5 | 36 |
| 5 | 5 | 34 |

Albuquerque tap water was spiked with arsenic to create an initial concentration of As(V) of 91 ppb, with an initial pH=8.4. FIG. 6 shows that adding 5 mg/L of alum coagulant (without any modifier) to the contaminated water caused a reduction in the As(V) concentration from 91 ppb to 42 ppb (a removal efficiency of 54%). Then, increasing amounts of the divalent cation modifier hydrous zinc sulfate were added to the contaminated water having a fixed concentration (5 mg/L) of alum coagulant, and the residual As(V) concentration was measured again. FIG. 6 shows that increasing the concentration of hydrous zinc sulfate somewhat reduced the residual As(V) concentration. At the maximum dosage used (5 mg/L of hydrous zinc sulfate) the residual As(V) concentration was reduced from 42 ppb (coagulant without modifier) to 34 ppb (coagulant plus modifier).

A comparison of the results shown in FIGS. 5 and 6 shows that the Fe—Cu system is more effective at removing arsenic(V) than the Al—Zn system. Also, adding copper cations to ferric chloride coagulants enhances the performance of the combined system more efficiently than adding zinc cations to alum coagulants.

The observed general increase in anion sorption efficiency of the enhanced coagulation process achieved by modifying the chemistry of the trivalent metal cation coagulant by mixing it with a divalent metal cation modifier strongly suggests that the amount of coagulant needed to achieve the same level of arsenic reduction can be significantly reduced by adding the modifier. This can be seen by comparing FIG. 3 and FIG. 6. Comparing these two sets of experiments, complete removal (100%) of arsenic was achieved by using a un-enhanced coagulant comprising 7.5 mg/L of ferric chloride (without modifier), or, alternatively, by using a enhanced coagulant comprising a combination of 5 mg/L of ferric chloride and 2.5 mg/L of copper salt (e.g., hydrous copper sulfate).

The concomitant advantages of using less coagulant media (e.g., ferric chloride), achieved through the addition of divalent metal cation modifiers, include less clogging of expensive filters, longer filter life, reduced downtime for backwashing and filter replacement, less sludge generated, and no need for additional, expensive pH adjustment. Addition of divalent metal cation modifiers may also help to stabilize new or old anion-containing coagulated sludges by reducing the rate at which anion contaminants are leached from the sludge (which can be disposed of as non-hazardous waste).

In practice, at a water treatment facility, a highly concentrated solution of the trivalent metal cation coagulant (e.g., ferric chloride) would be injected into a stream containing the anionic contaminated water while a highly concentrated solution of the divalent metal cation modifier (e.g., copper sulfate) is simultaneously injected into the stream, either at the same location, or close to each other, but before entering a mixing chamber or flocculation chamber.

Additionally, an enhanced coagulant medium could be manufactured, stored, and shipped in a concentrated or a highly concentrated aqueous solution comprising both the trivalent metal cation coagulant (e.g., ferric chloride) and the divalent metal cation modifier (e.g., copper sulfate) pre-mixed together, which would be suitable for injection into a contaminated water stream as a single source of enhanced coagulant.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A process for decontaminating water containing anionic contaminants selected from the group consisting of arsenate, arsenite, chromate, fluoride, selenate, and borate, and combinations thereof, comprising:
   a) contacting 2.5–10.0 mg/L of a iron-containing trivalent metal cation coagulant and 0.1–5.0 mg/L of a copper-containing divalent metal cation modifer with the contaminated water;
   b) forming enhanced trivalent metal cation flocs;
   c) adsorbing the anionic contaminants onto the enhanced flocs;
   d) filtering and removing the contaminated flocs from the water, thereby producing decontaminated water.

2. The process of claim 1, wherein the iron-containing trivalent metal cation coagulant is selected from the group consisting of ferric chloride, ferric sulfate, ferrous sulfate, polyiron chloride, and combinations thereof.

3. The process of claim 1, wherein the cooper-containing divalent metal cation modifier is selected from the group consisting of copper sulfate, copper chloride, copper nitrate, and copper acetate, hydrous copper sulfate, hydrous copper chloride, hydrous copper nitrate, hydrous copper acetate, and combinations thereof.

4. The process of claim 1, wherein the trivalent metal cation coagulant comprises ferric chloride and the divalent metal cation modifier comprises hydrous copper sulfate.

5. The process of claim 1, wherein the contaminated water mixed with the coagulant and the modifier has a pH of about 8.0 to 8.4.

6. The process of claim 5, further comprising adjusting the pH of the contaminated water mixed with the coagulant and the modifier to about pH=7–8, to minimize the solubility of ferric hydroxide $Fe(OH)_3$ precipitates while forming the enhanced flocs.

7. A process for decontaminating water containing anionic contaminants selected from the group consisting of arsenate, arsenite, chromate, fluoride, selenate, and borate, and combinations thereof, comprising:
   a) contacting 2.5–10.0 mg/L of an aluminum-containing trivalent metal cation coagulant and 0.1–5.0 mg/L of a zinc-containing divalent metal cation modifer with the contaminated water;
   b) forming enhanced trivalent metal cation flocs;
   c) adsorbing the anionic contaminants onto the enhanced flocs;
   d) filtering and removing the contaminated flocs from the water, thereby producing decontaminated water.

8. The process of claim 7, wherein aluminum-containing trivalent metal cation coagulant is selected from the group consisting of aluminum sulfate, alum, sodium aluminate, polyaluminum chloride, polyaluminum hydroxychloride, and combinations thereof.

9. The process of claim 7, wherein the zinc containing divalent metal cation modifier is selected from the group consisting of zinc sulfate, zinc sulfate, zinc chloride, zinc nitrate, hydrous zinc sulfate, hydrous zinc sulfate, hydrous zinc chloride, hydrous zinc nitrate, and combinations thereof.

10. The process of claim 7, wherein the trivalent metal cation coagulant comprises alum and the divalent metal modifier comprises hydrous zinc sulfate.

11. The process of claim 7, further comprising adjusting the pH of the contaminated water mixed with the coagulant and the modifier to about pH=6.0–6.5, to minimize the solubility of aluminum hydroxide $Al(OH)_3$ precipitates while forming the enhanced flocs.

* * * * *